(12) United States Patent
Leisten et al.

(10) Patent No.: US 6,989,998 B2
(45) Date of Patent: Jan. 24, 2006

(54) METHOD OF DETERMINING A REQUIRED INDUCTANCE-CURRENT RELATIONSHIP FOR AN INDUCTOR

(75) Inventors: Joe Leisten, Renfrewshire (GB); Brian Lees, Renfrewshire (GB); Stuart Dodds, Renfrewshire (GB)

(73) Assignee: Minebea Co. Ltd., (JP)

( * ) Notice: Subject to any disclaimer, the term of this patent is extended or adjusted under 35 U.S.C. 154(b) by 69 days.

(21) Appl. No.: 10/416,846

(22) PCT Filed: Sep. 13, 2001

(86) PCT No.: PCT/GB01/04104

§ 371 (c)(1),
(2), (4) Date: Sep. 22, 2003

(87) PCT Pub. No.: WO02/43231

PCT Pub. Date: May 30, 2002

(65) Prior Publication Data

US 2004/0027840 A1 Feb. 12, 2004

(30) Foreign Application Priority Data

Nov. 27, 2000 (GB) .................................. 0028868

(51) Int. Cl.
*H02M 1/42* (2006.01)
(52) U.S. Cl. ........................................................ 363/47
(58) Field of Classification Search .................. 363/47, 363/86, 89, 125
See application file for complete search history.

(56) References Cited

U.S. PATENT DOCUMENTS 5,661,348 A * 8/1997 Brown ........................ 307/43
6,608,770 B2 * 8/2003 Vinciarelli et al. ........... 363/61

OTHER PUBLICATIONS

Jovanovic et al., Merits and limitations of full-bridge rectifier with Ic filter in meeting iec 1000-3-2 harmonic limit specifications, 1996, IEEE, pp. 354-360.*

* cited by examiner

*Primary Examiner*—Shawn Riley
(74) *Attorney, Agent, or Firm*—Ipsolon LLP (57) ABSTRACT

A method of determining the inductance required to maintain the amplitudes of harmonic current waveforms in a rectifier circuit below a predetermined level includes a rectifier circuit that has an inductor and a capacitor. The circuit draws power from a varying power source and supplies power to a load. The method includes the steps of calculating, using a resonant analysis method, an expression for the input current waveform in the rectifier circuit in terms of the inductance of the inductor when a predetermined input voltage waveform is applied to the rectifier circuit. The capacitor has a predetermined capacitance and the load drawing has a predetermined current from the rectifier circuit. The method also includes the step of determining the amplitudes of harmonic current waveforms constituting the calculated input current waveform in the rectifier circuit, and providing a value for the inductor in the rectifier circuit at which none of the amplitudes of the harmonic current waveforms constituting the calculated input current waveform in the rectifier circuit exceed the predetermined level.

17 Claims, 3 Drawing Sheets

METHOD OF DETERMINING A REQUIRED INDUCTANCE-CURRENT RELATIONSHIP FOR AN INDUCTOR

FIELD OF THE INVENTION

THIS INVENTION relates to a method of determining a required inductance-current relationship for an inductor, and in particular to determining a required inductance/current relationship for a passive PFC inductor in a rectifier that is required to maintain compliance with harmonic current regulations.

BACKGROUND

Figure 1:
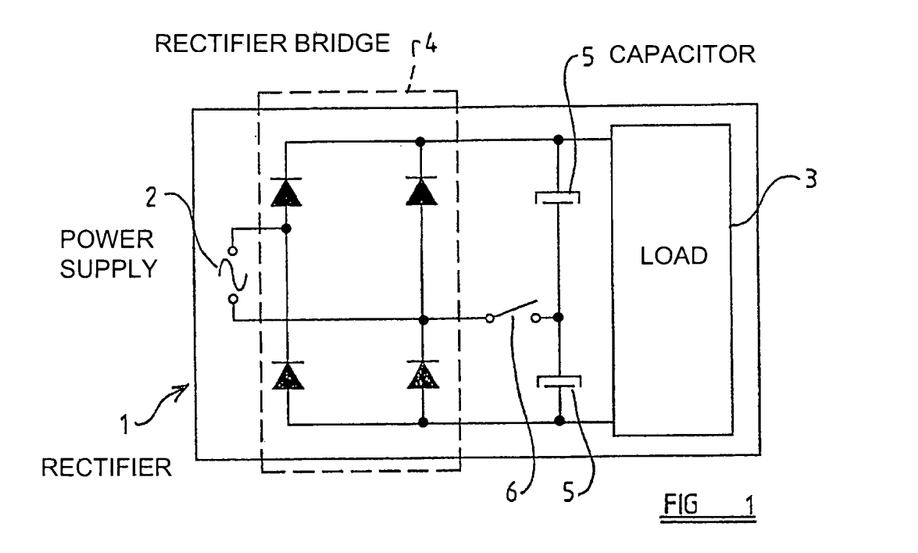
FIG. 1 is a circuit diagram of a conventional rectifier.

A schematic view of a rectifier used in the power supplies of, inter alia, most personal computers is shown in FIG. 1 of the accompanying drawings. The rectifier comprises a connection to a power source (for example, the mains) and a connection to a load, i.e., the power drawn by the machine of which the rectifier forms a part. The power source and the load are connected to one another by a diode rectifier bridge, which allows current to flow only from the power source to the load, and not in the opposite direction. Two bulk capacitors, connected in series with one another, are connected in parallel with the load.

A (usually mechanical) voltage selector switch is connected between the two bulk capacitors and an input of the diode rectifier bridge. The rectifier may be switched between "standard rectifier mode" (for use with, for instance, 230V mains power sources as used in the UK) and "voltage doubler mode" (for use with, for example, Japanese 100V mains power sources).

While this rectifier is flexible and simple to build, it suffers from certain drawbacks. Due to the fact that the power source is connected to the bulk capacitors and to the load by a forward-biased diode rectifier bridge, current will only flow from the power source to the bulk capacitors and the load when the power source voltage exceeds that across the bulk capacitors. At other times, no current will flow from the power source. As a result, the rectifier draws an inherently non-sinusoidal current from the power source, and this introduces current harmonics into the power source. The introduction of such harmonics is undesirable as it can lead to a greater root mean square (i.e. heating) current in the rectifier, and can cause protection equipment to trip at lower power ratings than would usually occur. This problem is exacerbated if many users connect to the same power source and all introduce current harmonics into the power source.

The location of an inductor (known as a passive power factor correction (PFC) inductor) between the diode rectifier bridge and the bulk capacitors has the effect of reducing the amplitude of the current harmonics introduced into the power source. However, it is desirable to introduce an inductor of minimal size and weight into the rectifier circuit, to reduce the manufacturing and transportation costs of the rectifier.

In order for a passive PFC inductor to be of minimal size and weight and also be effective in reducing current harmonics over a range of input voltages, it is necessary for the inductor to have an inductance that varies with the current flowing therethrough.

However, it can be difficult to predict the inductance-current relationship that a passive PFC inductor must have to comply with a given regulation concerning minimum current harmonic introduction. Previous methods of predicting the required relationship have involved the correlation of data from multiple simulation runs to produce empirical design equations, such as those produced by Red1. When generating these equations, Red1 assumed that the bulk capacitors were sufficiently large that the ripple voltage across them (arising from the continual charging and discharging thereof) could be neglected. Apart from the large amount of time required to generate the empirical equations, a disadvantage of this approach is that in many practical situations the ripple voltage on the bulk capacitors is of sufficient magnitude that it cannot be neglected.

SUMMARY OF THE INVENTION

It is an object of the present invention to provide a method of determining the inductance-current relationship that a passive PFC inductor requires to maintain the amplitudes of harmonic current waveforms introduced into a power source by a rectifier of which the inductor is a part below a predetermined level whilst still having a minimum size and weight.

Accordingly, one aspect of the present invention provides a method of determining the inductance required to maintain the amplitudes of harmonic current waveforms in a rectifier circuit below a predetermined level, the rectifier circuit comprising an inductor and a capacitor, drawing power from a varying power source and supplying power to a load, the method comprising the steps of: calculating, using a resonant analysis method, an expression for the input current waveform in the rectifier circuit in terms of the inductance of the inductor when a predetermined input voltage waveform is applied to the rectifier circuit, the capacitor having a predetermined capacitance and the load drawing a predetermined current from the rectifier circuit; determining the amplitudes of harmonic current waveforms constituting the calculated input current waveform in the rectifier circuit; and providing a value for the inductor in the rectifier circuit at which none of the amplitudes of the harmonic current waveforms constituting the calculated input current waveform in the rectifier circuit exceed the predetermined level.

Advantageously, the predetermined current drawn by the load from the rectifier circuit is the maximum current that the load may draw from the rectifier circuit Preferably, the step of using a resonant analysis method comprises the step of dividing a duty cycle of the power source into first and second intervals, in which current flows from the power source to the capacitor during the first interval and current does not flow from the power source to the capacitor in the second interval.

Conveniently, the method further comprises the steps of: setting initial and final values for the current flowing through the inductor for each interval; and equating the final value for the current flowing through the inductor for each interval with the initial value for the current flowing through the inductor for the other interval.

Advantageously, the method further comprises the step of formulating, for each interval, a current differential equation for the current flowing through the inductor with phase angle of the input voltage waveform.

Preferably, the method further comprises the step of solving the current differential equation to provide the input current waveform.

Conveniently, the step of solving the current differential equation comprises the step of using Laplace analysis.

Advantageously, the method further comprises the step of utilising the solution of the current differential equation to define start and finish points for the first and second intervals.

Preferably, the method further comprises the steps of: setting initial and final values for the voltage across the capacitor for each interval, and equating the final value for the voltage across the capacitor for each interval with the initial value for the voltage across the capacitor for the other interval.

Conveniently, the method further comprises the step of formulating, for each interval, a voltage differential equation for the voltage across the capacitor with phase angle of the input voltage waveform.

Advantageously, the method further comprises the step of solving the voltage differential equation.

Preferably, the step of determining the amplitudes of harmonic current waveforms constituting the calculated input current waveform in the rectifier circuit comprises the step of applying Fourier analysis to the input current waveform.

Conveniently, the method further comprises the step of determining a steady state operating point of the rectifier circuit.

Advantageously, the step of determining a steady state operating point of the rectifier circuit comprises the step of establishing an operation of the rectifier when the energy stored in the rectifier circuit at the end of each whole waveform of the input voltage is the same as that stored in the rectifier circuit at the end of each whole waveform of the input voltage.

Preferably, the step of establishing an operation of the rectifier when the energy stored in the rectifier circuit at the end of each whole waveform of the input voltage is the same as that stored in the rectifier circuit at the end of each whole waveform of the input voltage comprises the step of considering the energy stored in the inductor and the capacitor.

Conveniently, the step of providing a value for the inductor at which none of the amplitudes of the harmonic current waveforms constituting the calculated input current waveform in the rectifier circuit exceed the predetermined level comprises the step of providing a value for the inductor at which the third harmonic of the harmonic current waveforms constituting the calculated input current waveform in the rectifier circuit does not exceed the predetermined level.

Another aspect of the present invention provides a method of determining a required relationship between the inductance of an inductor and the current flowing through the inductor, comprising the steps of: repeating the above method for a plurality of input voltage waveforms or load currents, each of the plurality of input voltage waveforms or load currents causing different currents to flow through the inductor during the duty cycles thereof; and determining the inductance required to maintain the amplitudes of harmonic current waveforms in the rectifier circuit below the predetermined level for each of the plurality of input voltage waveforms or load currents.

A further aspect of the present invention provides a rectifier circuit comprising an inductor and a capacitor, the rectifier circuit being produced by the steps of: defining the capacitance of the capacitor, defining a predetermined current to be drawn by a load from the rectifier circuit; calculating, using a resonant analysis method, an expression for the input current waveform in the rectifier circuit in terms of the inductance of the inductor, the capacitance of the capacitor, a predetermined input voltage waveform to be applied to the rectifier circuit and the predetermined current to be drawn from the rectifier circuit by the load; determining the amplitudes of harmonic current waveforms constituting the calculated input current waveform in the rectifier circuit; providing a value for the inductor at which none of the amplitudes of the harmonic current waveforms constituting the calculated input current waveform in the rectifier circuit exceed a predetermined level; and constructing the rectifier circuit to contain an inductor having the provided value of inductance.

Advantageously, the inductor has an inductance that varies with the current flowing therethrough.

In order that the present invention may be more readily understood, embodiments thereof will now be described, by way of example, with reference to the accompanying drawings, in which:

DETAILED DESCRIPTION OF PREFERRED EMBODIMENT OF THE INVENTION

As described above, FIG. 1 shows a conventional rectifier 1 as used in most personal computer power supplies. The rectifier 1 comprises a power source 2, (e.g. a mains supply) having a sinusoidal input voltage waveform connected to a load 3 by a forward-biased diode rectifier bridge 4, which allows current to flow only from the voltage input 2 to the load 3 and not in the opposite direction. Two bulk capacitors 5, which are connected in series with one another, are connected in parallel across the load 3. A voltage selector switch 6 is provided, connected from a location between the two bulk capacitors 5 to an input of the diode rectifier bridge 4. The voltage selector switch 6 may be used to determine whether the rectifier 1 will operate in "standard rectifier mode" (in which the voltage selector switch 6 is open) or in "voltage doubler mode" (when the voltage selector switch 6 is closed).

Figure 2:
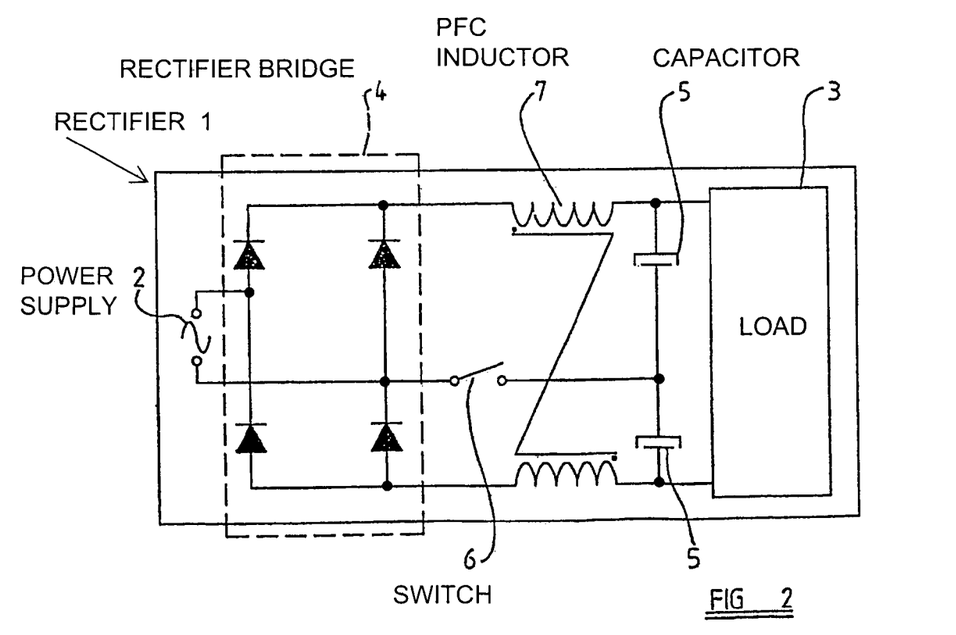
FIG. 2 is a circuit diagram of the rectifier of FIG. 1 with an additional passive PFC inductor.

As described above, the rectifier 1 is cheap and offers flexibility of use. However, it does not comply with harmonic input current requirements. In order to reduce the current harmonics introduced into the power source 2 by the rectifier 1, a passive PFC inductor may be introduced between the diode rectifier bridge 4 and the bulk capacitors 5, as shown in FIG. 2. The passive PFC inductor 7 comprises two windings, each of which is connected in series with one of the terminals of the load 3.

If a passive PFC inductor 7 having a sufficiently large inductance is employed, it is possible to reduce the harmonics introduced into the power source 2 by the rectifier 1 to below predetermined levels (for example, those set by the appropriate regulations). However, inductors are inherently bulky, and it is desirable to use the smallest and lightest inductor possible in order to minimise production and transportation costs of the rectifier 1. Hence, it is important to know the properties that a passive PFC inductor 7 that is to be used with the rectifier 1 must have. As described above, if the passive PFC inductor 7 is to be useable with a range of input voltages and/or load currents, the inductance thereof must vary with the current flowing therethrough.

As described above, the rectifier 1 draws an inherently non-sinusoidal current from the power source 2, and current flows from the power source 2 to the load 3 and bulk capacitors 5 only when the voltage across the power source 2 exceeds that across the bulk capacitors 5. If the current harmonics introduced into the power source by this irregular flow of current are to be calculated accurately, an expression for the input current waveform is required. The input current waveform is determined by the physical characteristics of the bulk capacitors 5, the passive PFC inductor 7 and the input voltage waveform of the power source. One method of determining the input current waveform is to construct differential equations for the variation of the current with time, or with the phase angle of the input voltage waveform. These differential equations may be solved to give the actual input current waveform.

In embodiments of the present invention, once the input current waveform has been established, the: individual harmonic current waveforms constituting the input current waveform need to be calculated. In theory, there might be an infinite series of such harmonic waveforms, however the lower modes of the series (i.e. those with longer wavelengths) will, in practice, make a far stronger contribution to the power source current. Hence, the higher modes can usually be neglected if the amplitudes of the lower mode harmonic waveforms are below a desired level. One way in which the input current waveform might be reduced to the constituent harmonic waveforms thereof is by Fourier analysis.

The inductance of the passive PFC inductor 7 must be chosen such that the amplitude of the strongest harmonic current waveform is maintained below the desired level. Clearly, once this is achieved, none of the other harmonic current waveforms will have an amplitude above the desired level.

In an embodiment of the present invention, the duty cycle of the power source is divided into two intervals for analysis: the first interval being that during which current flows from the power source 2 to the load 3 and bulk capacitors 5; and the second interval being that during which no current flows from the power source 2. The "standard rectifier mode" operation of the rectifier 1 will be considered first using this analysis.

Figure 3:
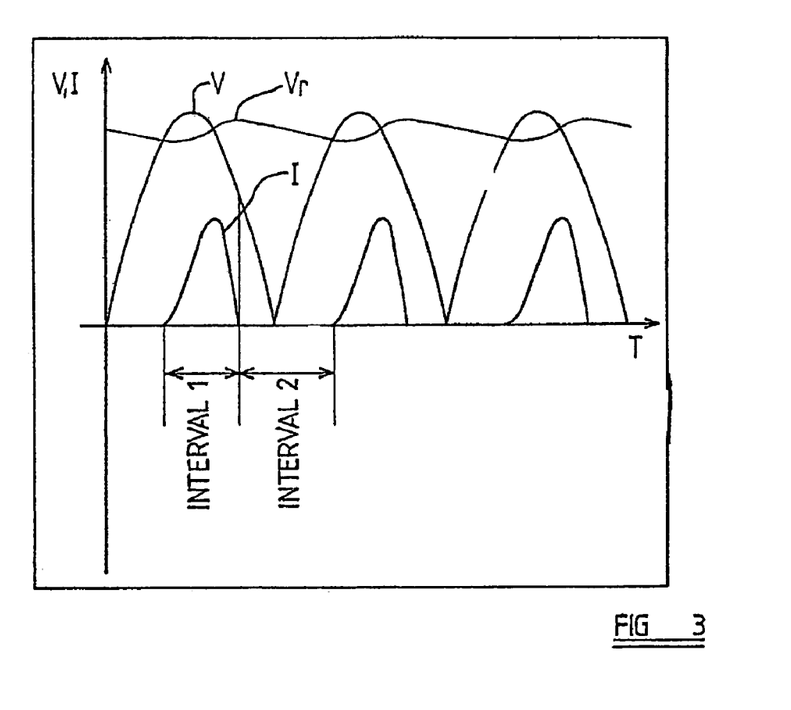
FIG. 3 is a graph showing the variation of input voltage and current waveforms to, and voltage across a capacitor of the rectifier of FIG. 2 with time.

A schematic representation of the power source input voltage, the current (designated by I) flowing through the passive PFC inductor 7 and the voltage (designated by V) across the bulk capacitors 5 against time is shown in FIG. 3. It will be appreciated that, whilst the power source input voltage is smooth and sinusoidal, current flows through the passive PFC inductor 7 and to the bulk capacitors 5 and load 3 in short "spikes". The voltage across the bulk capacitors 5 rises as the bulk capacitors are charged during the time in which current is flowing from the power source 2 to the load 3, and falls as the bulk capacitors 5 discharge across the load 3 when this current does not flow, leading to a "ripple" voltage (designated by Vr on FIG. 3) across the bulk capacitors 5. On FIG. 3, the portion of each power source input voltage half duty cycle during which current flows from the power source 2 to the load 3 is designated as interval 1, and the remainder of the half duty cycle of the power source 2 is designated as interval 2.

Turning to the first interval, the first interval begins when the magnitude of the power source input voltage exceeds the voltage across the bulk capacitors 5. When this happens, the diode rectifier bridge 4 begins to conduct, and a resonant transfer of energy takes place between the passive power factor corrector inductor 7 and the bulk capacitors 5. The first interval ends when the current flowing through the passive PFC inductor 7 (and hence through the rectifier 1) falls to zero.

Figure 4:
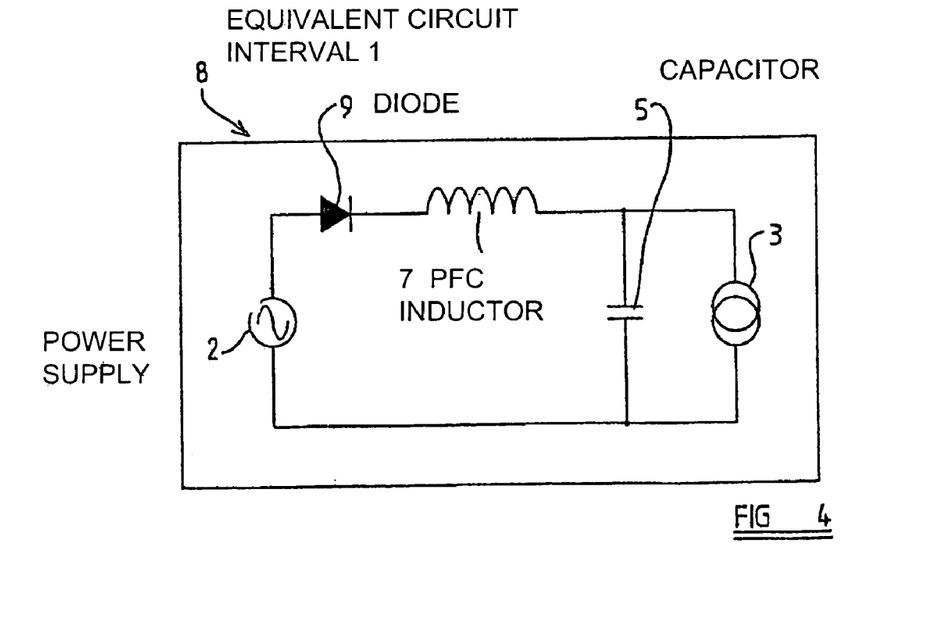
FIG. 4 is a circuit diagram of an equivalent circuit for a first operating interval of the rectifier of FIG. 2.

An equivalent circuit 8 for the first interval is shown in FIG. 4, which comprises the power source 2, a single diode 9, the passive PFC inductor 7 and the load 3 connected in series with one another, with a single bulk capacitor 5 connected in parallel with the load 3. These are the only components that need to be considered during the first interval, and the construction of such an equivalent circuit facilitates analysis of the behaviour of the rectifier.

The initial condition for the normalised current $i_{i1n}$ flowing through the passive PFC inductor 7 during the first interval is:

$$i_{i1n}(0)=0 \qquad (1)$$

where $$i_{i1n}(\theta) = \frac{i_{i1}(\theta)}{v_{pk}} \sqrt{\frac{L_e}{C_e}} \qquad (2)$$

$i_{i1}(\theta)$ being the actual (i.e. unnormalised) current flowing through the passive PFC inductor 7 at phase angle $\theta$, $v_{pk}$ being the peak voltage of the power source input, $L_e$ being the effective inductance of the passive PFC inductor (taken to be 4L in standard rectifier mode, where L is the actual inductance of each winding of the passive PFC inductor 7) and $C_e$ being the effective capacitance of the bulk capacitor 5 (taken to be C/2 in standard rectifier mode, where C is the actual capacitance of each bulk capacitor 5).

This initial condition is self-explanatory, as the first interval begins at the instant current begins to flow through the passive PFC inductor 7.

The corresponding initial condition for the normalised voltage $v_{c1n}$ across the bulk capacitor 5 at the commencement of the first interval is:

$$v_{c1n}(0)=v_{c0n} \qquad (3)$$

where $$v_{c1n}(\theta) = \frac{v_{c1}(\theta)}{v_{pk}} \qquad (4)$$

$V_{c0n}$ being the normalised initial voltage across the bulk capacitor and $v_{c1}(\theta)$ being the unnormalised voltage across the bulk capacitor 5 at phase angle $\theta$.

At the end of the first interval, as discussed above, the current flowing through the passive PFC inductor 7 will again have fallen to zero, and to the final condition for this normalised current is:

$$i_{i1n}(\theta_1)=0 \qquad (5)$$

where $\theta_1$ is the angular duration of the first interval. The final condition for the voltage across the bulk capacitor 5 at the end of the first interval is:

$$v_{c1n}(\theta_1)=v_{c1n} \qquad (6)$$

It is possible to construct differential equations for the rates of change of the current flowing through the passive PFC inductor 7 and the voltage across the bulk capacitor 5 with phase angle, and the normalised differential equations for the equivalent circuit shown in FIG. 4 are:

$$\frac{d}{d\theta} i_{i1n}(\theta) = \sin(\gamma \cdot \theta + \gamma \cdot \theta_{sc}) - v_{c1n}(0) \text{ and} \tag{7}$$

$$\frac{d}{d\theta} v_{c1n}(\theta) = i_{i1n}(\theta) - I_{ln} \text{ where} \tag{8}$$

$$\gamma = \frac{\omega}{\omega_r} \tag{9}$$

$\omega$ being the angular frequency of the power source input voltage, $\omega_r$ being the natural frequency of the rectifier 1

$$\left( \omega_r = \frac{1}{\sqrt{LC}} \right), \theta_{sc} = \frac{1}{\gamma} \cdot a\sin(v_{c0n})$$

and $I_{1n}$ is the normalised load current (assumed constant), where $$I_{ln} = \frac{I_l}{v_{pk}} \sqrt{\frac{L_e}{C_e}} \tag{10}$$

$I_1$ being the actual load current. The assumption in the presented calculations that the load current I is constant is one that will, in general, hold true over the timescale of one half of the power source duty cycle. On a longer timescale, the current drawn by the load is variable and, in the case of a computer, may vary on the number of hard disk drives within the computer, or the activity of the computer's processor. Clearly, the magnitude of the current drawn by the load 3 affects the current that flows across the rectifier 1, and the passive PFC inductor 7 must suppress current harmonics to below the predetermined level for all possible currents that the load 3 may draw.

Equations 7 and 8 may be solved using Laplace analysis to give:

$$i_{i1n}\left(\frac{\theta}{\omega_r}\right) = \cos(\theta)\left[-I_{ln} - \frac{\cos(\gamma \cdot \theta_{sc})}{\left(\frac{1}{\gamma} - \gamma\right)}\right] + \tag{11}$$

$$\sin(\theta)\left[\frac{\sin(\gamma \cdot \theta_{sc})}{1 - \gamma^2} - v_{c0n}\right] + \frac{\cos(\gamma \cdot \theta + \gamma \cdot \theta_{sc})}{\frac{1}{\gamma} - \gamma} + I_{pl}$$

and $$v_{c1n}\left(\frac{\theta}{\omega_r}\right) = \sin(\theta)\left[-I_{ln} - \frac{\cos(\gamma \cdot \theta_{sc})}{\left(\frac{1}{\gamma} - \gamma\right)}\right] - \tag{12}$$

$$\cos(\theta)\left[\frac{\sin(\gamma \cdot \theta_{sc})}{1 - \gamma^2} - v_{c0n}\right] + \frac{\sin(\gamma \cdot \theta + \gamma \cdot \theta_{sc})}{\frac{1}{\gamma} - \gamma^2}$$

The first interval ends, as described above, when the current flowing through the passive PFC inductor 7 falls to zero (Equation 3). $\theta_1$ can be, determined numerically by setting Equation 7 equal to zero:

$$\theta_1 = \omega_r T_1 \tag{13}$$

where $T_1$ is the time duration of the first interval.

Turning to the second interval, the second interval begins immediately as the first interval finishes. During the second interval, the bulk capacitors 5 are discharged by the load current which, as described above, is assumed to be constant for the duration of a half-cycle of the input voltage waveform. The second interval ends when the power source input voltage rises above the voltage across the bulk capacitors 5 (i.e. the start of the first interval once again).

Figure 5:
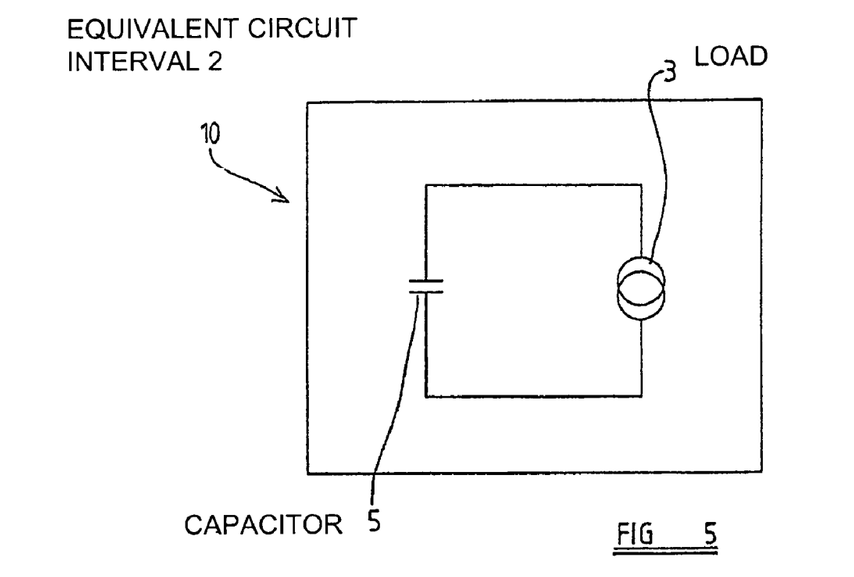
FIG. 5 is a circuit diagram of an equivalent circuit for a second operating interval of the rectifier of FIG. 2.

An equivalent circuit 10 for the second interval is shown in FIG. 5, and comprises a single bulk capacitor 5 discharging across the load 3, which are the only components that need to be considered during the second interval.

The initial condition for the current flowing through the passive PFC inductor 7 during the second interval is:

$$i_{i2n}(0) = 0 \tag{14}$$

and the corresponding initial condition for the normalised voltage across the bulk capacitor 5 is:

$$v_{c2n}(0) = v_{c1n} \tag{15}$$

It will be appreciated that the initial values of current and voltage for the second interval are the same as the final values of these quantities for the first interval.

The final condition for the current flowing through the passive PFC inductor 7 for the second interval is:

$$i_{i2n}(\theta_2) = 0 \tag{16}$$

where $\theta_2$ is the angular duration of interval 2. Indeed, it will be clear to a person of ordinary skill in the art that this current is zero, by definition, throughout the second interval.

The final condition for the voltage across the bulk capacitor 5 is:

$$v_{c2n}(\theta_2) = v_{c2n} \tag{17}$$

The normalised differential equations for the rates of change of the normalised current and voltage discussed above with phase angle during the second interval are rather simpler to calculate that those given above for the first interval, and are:

$$\frac{d}{d\theta} i_{i2n}(\theta) = 0 \text{ and} \tag{18}$$

$$\frac{d}{d\theta} v_{c2n}(\theta) = -I_{ln} \tag{19}$$

respectively. These differential equations can be solved to give:

$$i_{i2n}\left(\frac{\theta}{\omega_r}\right) = 0 \text{ and} \tag{20}$$

$$v_{c1n}\left(\frac{\theta}{\omega_r}\right) = v_{c1n} - I_{ln} \cdot \theta \tag{21}$$

where the normalised current flowing through the passive PFC inductor 7 during the second interval is given by:

$$i_{i2n}(\theta) = \frac{i_{12}(\theta)}{v_{pk}} \sqrt{\frac{L_e}{C_e}} \quad (22)$$

and the normalised voltage across the bulk capacitor 5 is given by $$v_{c2n} = \frac{v_{c2}(\theta)}{v_{pk}} \quad (23)$$

in a similar manner to those described above in relation to the first interval.

The second interval ends when the power source input voltage exceeds the voltage across the bulk capacitor 5 so that the diode rectifier bridge 4 begins to conduct, and this condition can be expressed as:

$$\sin(\gamma \cdot \theta_{sc} + \gamma \cdot \theta_1 + \gamma \cdot \theta_2) = v_{c2n}(\theta) \quad (24)$$

Hence, the angular duration of the second interval ($\theta_2$) can be found:

$$\theta_2 = \omega_r T_2 \quad (25)$$

Where $T_2$ is the time duration of the second interval.

During normal operation of the rectifier 1, the rectifier 1 will be in steady state operation. Steady state operation is achieved when the energy stored in the rectifier 1 at the end of each duty half cycle of the input voltage waveform of the power source 2 is the same as the energy stored at the start of the duty half cycle. During the second interval, the current flowing through the passive PFC inductor 7 is always zero, and so it is only necessary to consider the energy stored in the bulk capacitors 5. Hence, if the voltage across the bulk capacitors 5 at the end of interval 2 is equal to the voltage across them at the start of interval 1, the condition for steady state operation is met. This condition may be expressed as:

$$v_{c2n}\left(\frac{\theta_2}{\omega_r}\right) = v_{c0n} \quad (26)$$

from Equations (17) and (2).

In this case, equation 24 may be simplified to give:

$$\theta_2 = \frac{\pi}{\gamma} - \theta_1 \quad (27)$$

Equations 5, 26 and 27 may be solved numerically to determine a steady state operating point, assuming known values of $\gamma$ and normalised load current.

Once the steady state operating point for the rectifier 1 has been found, the corresponding power source input current waveform can be derived. The normalised harmonic components of this power source input current waveform can be determined by fourier series expansion of equation 11:

$$a_n(h) = \frac{2\gamma}{\pi} \sqrt{\left(\int_0^{\theta_1} i_{i1n}(\theta) \cdot \cos(h \cdot \omega \cdot \theta) d\theta\right)^2 + \left(\int_0^{\theta_1} i_{i1n}(\theta) \cdot \sin(h \cdot \omega \cdot \theta) d\theta\right)^2} \quad (28)$$

where $a_n(h)$ is the amplitude of the hth harmonic of the series.

To ensure that the current harmonics introduced into the power source are below the predetermined level, each of the harmonic current components determined by equation 28 must be lower Man the predetermined level. In practice, the largest of the current harmonics is usually the third harmonic, and in almost all cases it is necessary only to consider this harmonic to establish the smallest inductance value that can be used to achieve compliance with a given regulation. For the appropriate regulation to be complied with, it must be the case that:

$$a_{nRMS}(3) \leq I_{limn}(h) \cdot P_{inn} \quad (29)$$

where $I_{limn}$ is the normalised limit for introduced harmonic current and $P_{inn}$ is the normalised power delivered to the load.

Hence, the boundary case (ie the passive PFC inductance that will just achieve compliance) for the third harmonic may be expressed as:

$$I_{lim}(h) \cdot P_{inn} = a_{nRMS}(h) \quad (30)$$

where $$I_{limn}(h) = I_{lim}(h) \cdot \overline{2.230}v \quad (31)$$

the factor of $\overline{2.230}$ v being present to normalise this solution From this result, it is possible to calculate the inductance from that the passive PFC inductor must have to ensure that the amplitudes of the input current harmonics are maintained below a desired level.

Hence, it can be seen that examples of the present invention do not suffer from the above described drawback of assuming the ripple voltage across the bulk capacitors to be negligible, and employ a resonant method of modelling the current flowing through the passive PFC inductor 7 and the voltage across the bulk capacitors 5. Each half duty cycle is divided into two operating intervals based upon the conduction state of the diode rectifier bridge, and differential equations that define the circuit operation during each of these intervals are generated. Preferably, equivalent circuits for each interval are employed to facilitate, the generation of these differential equations. The defining differential equation are solved and the initial and final conditions of all state variables are equated across the interval boundaries to produce a system of equations that describe operation of the rectifier 1 over each duty half cycle. Finally, a steady state operating point is calculated by ensuring that the state variables at the end of each power source half duty cycle are equal to their initial values at the start of the power source half duty cycle.

It will be appreciated that this method allows the calculation of the power source input current, and hence the required inductance-current relationship for a passive PFC inductor, with a high degree of accuracy.

It will be noted that in the above analysis, it is assumed that: the current drawn by the load 3 from the bulk capacitors 5 is constant; the diode bridge is ideal with zero forward voltage drop and no switching loss; all reactive components are ideal with no parasitic loss; and the power source impedance is zero. These assumptions are valid, in normal operation, and lead to very small inaccuracies. If necessary, corrections for any of these assumptions can be included in the above method, and it will be within the knowledge of a person of ordinary skill in the art to apply such corrections.

From the steady state solution calculated above, it is possible to establish a number of important design parameters for the passive PFC inductor 7 and the load 3.

Firstly, the average bulk capacitor voltage may be calculated. This quantity is important because it enables the calculation of the power delivered to the load 3, which is the power available to operate the machine of which the rectifier 1 is a part. The average voltage $v_{cav}$ across the bulk capacitors 5 is given by:

$$v_{cav} = \frac{\omega}{\pi}\left(\int_0^{T_1} v_{c1}(t)\,dt + \int_0^{T_2} v_{c2}(t)\,dt\right) \quad (32)$$

Hence, the normalised average bulk capacitor voltage is given by:

$$v_{cavn} = \frac{\gamma}{\pi}\left[\int_0^{\theta_1} v_{c1n}(\theta)\,d\theta + \frac{(v_{c1n}(\theta_1) - v_{c0n})}{2} \cdot \left(\frac{\pi}{\gamma} - \theta_1\right)\right] \quad (33)$$

The normalised power ($P_{1n}$) delivered to the load 3 may be expressed as:

$$P_{1n} = V_{cavn}.I_{1n} \quad (34)$$

Where $$P_{ln} = \frac{P_l}{v_{pk}^2}\sqrt{\frac{L_e}{C_e}} \quad (35)$$

$P_l$ being the actual power, in watts, drawn by the load 3 from the bulk capacitors 5.

The peak current that flows through the passive PFC inductor 7 will occur at some instance ($\theta_{pk}$) after the start of interval 1. $\theta_{pk}$ may be found by equating the first derivative of the current flowing through the passive PFC inductor 7 with respect to time to zero:

$$\frac{d}{d\theta}i_{i1n}(\theta_{pk}) = 0 \quad (36)$$

Hence, the normalsied peak current $I_{ipkn}$ is given by:

$$I_{ipkn} = i_{i1n}(\theta_{pk}) \quad (37)$$

The normalised root mean square RMS current $I_{iRMS}$ flowing through the passive PFC inductor 7 can also be determined as follows:

$$I_{iRMS} = \sqrt{\frac{2}{T} \cdot i_{i1}(t)^2\,dt} \quad (38)$$

Hence, the normalised RMS current $I_{iRMSn}$, is given by:

$$I_{iRMSn} = \sqrt{\frac{\gamma}{\pi}\int_0^{\theta_1} i_{i1n}(t)^2\,d\theta} \quad (39)$$

Where:

$$I_{iRMSn} = \frac{I_{iRMS}}{v_{pk}}\sqrt{\frac{L_e}{C_e}} \quad (40)$$

Finally, the ripple voltage across the bulk capacitors 5 can be calculated by establishing the minimum and maximum bulk capacitor voltages, which occur at instants $\theta_{cmin}$ and $\theta_{cmax}$ after the start of the first interval when the current through the passive PFC inductor 7 is equal to the constant current delivered to the load 3:

$$i_{i1n}(\theta_{cmin}, \theta_{cmax}) = I_{1n} \quad (41)$$

The minimum and maximum bulk capacitor voltages $v_{cmin}$, $v_{cmax}$ will then be given by:

$$v_{cmin} = v_{c1n}(\theta_{cmin}) \quad (42)$$

and $$v_{cmax} = v_{c1n}(\theta_{cmax}) \quad (43)$$

It will be appreciated that the above quantities are important considerations in the design and manufacturer of the rectifier 1, as the components must be able to withstand the peak voltages and currents that will occur in the rectifier 1, but must not be excessively large or heavy.

Analysis of the rectifier 1 in "voltage doubler mode" will now be considered. As discussed above, voltage doubler mode for the rectifier 1 is selected by closing the voltage selector switch 6.

Figure 6:
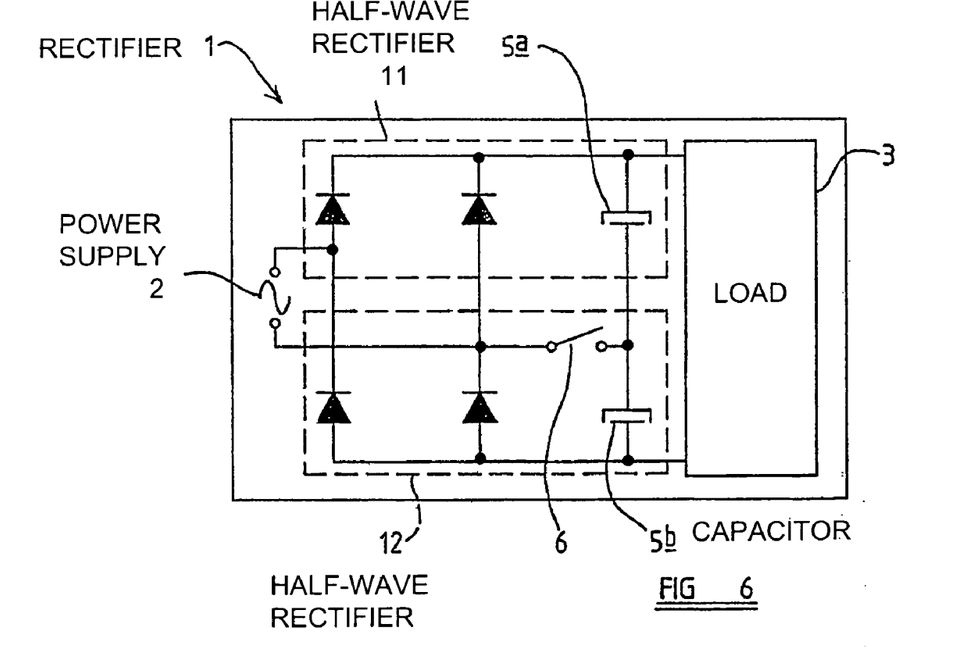
FIG. 6 is a circuit diagram of the rectifier of FIG. 2 during alternative operation thereof.

The rectifier 1, in voltage doubler mode, consists of two half-wave rectifier circuits 11, 12, as shown in FIG. 6. Each of the half-wave rectifier circuits 11, 12 comprises one of the bulk capacitors 5 and the bulk capacitors 5 contained in, the first and second rectifier circuits 11 and 12 are designated in FIG. 6 by reference numerals 5a and 5b respectively. During the positive half cycle of the power source duty cycle, the first half-wave rectifier circuit 11 charges the bulk capacitor 5a therein; while the second half-wave rectifier circuit 12 charges the bulk capacitor 5b therein during the negative half cycle of the power source duty cycle. The output voltage produced by the second half-wave rectifier 12 will be identical to that produced by the first half-wave rectifier 11, but with opposite polarity and with a phase displacement of 180°.

The equivalent circuits for each half-wave rectifier 11, 12 will be identical to those shown in FIGS. 4 and 5. Hence, all of the equations derived above for the fist and second intervals with respect to the standard rectifier mode of the rectifier 1 will also apply for these equivalent circuits except that, since the passive PFC inductor windings and bulk capacitors 5a, 5b are no longer connected in series, it will be the case that:

$$L_e = L \quad (44)$$

and $$C_e = C \quad (45)$$

As described above, steady state operation is achieved when the energy stored at the end of each power source duty half cycle is the same as that at the start of the duty half cycle. This condition may be expressed as:

$$v_{c2n}\left(\frac{\theta_2}{\omega_r}\right) = v_{c0n} \qquad (46)$$

In this case, equation 19 may be simplified to $$\theta_2 = \frac{\pi}{\gamma} - \theta_1 \qquad (47)$$

In a similar manner to above, equations 5, 41 and. 42 may be solved numerically to determine a steady state operating point, assuming known values of γ and load current.

Using the values obtained from solving these equations, equation 28 can be solved to give the normalised harmonic components of the power source input current waveform and, as described above, the inductance of the passive PFC inductor 7 that is required to comply with given regulations may be determined.

In a similar manner to that described above, it is possible to calculate important parameters required for design of the rectifier 1 from the steady state solution reached by the above method, and it will be clear to a person of ordinary skill in the art that the input power, peak and RMS inductor currents and bulk capacitor ripple voltage magnitude can readily be calculated.

It will be appreciated that, once the above analysis has been performed for both standard rectifier mode and voltage doubler mode, the inductance-current relationship that the passive PFC inductor 7 must have to comply with harmonic current regulations in either mode is readily established, and a passive PFC inductor with minimum inductance at appropriate values of input current (and hence minimum size and weight) can be included in the rectifier 1.

While the above examples describe the application of the present invention to specific circumstances, it will be clear to a person of ordinary skill in the art that the method may be used for any input voltage waveform and amplitude, and a relationship between the required inductance of the passive PFC inductor 7 and the cent flowing therethrough can be readily calculated for a given range of power source inputs.

In the present specification. "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of determining the inductance required to maintain the amplitudes of harmonic current waveforms in a rectifier circuit below a predetermined level, the rectifier circuit comprising an inductor and a capacitor, drawing power from a varying power source and supplying power to a load, the method comprising the steps of:

calculating, using a resonant analysis method, an expression for the input current waveform in the rectifier circuit in terms of the inductance of the inductor when a predetermined input voltage waveform is applied to the rectifier circuit, the capacitor having a predetermined capacitance and the load drawing a predetermined current from the rectifier circuit, the resonant analysis method comprising the steps of: dividing a duty cycle of the power source into first and second intervals, in which current flows from the power source to the capacitor during the first interval and current does not flow from the power source to the capacitor in the second interval; setting initial and final values for the current flowing through the inductor for each interval; and equating the final value for the current flowing through the inductor for each interval with the initial value for the current flowing through the inductor for the other interval;

determining the amplitudes of harmonic current waveforms constituting the calculated input current waveform in the rectifier circuit; and providing a value for the inductor in the rectifier circuit at which none of the amplitudes of the harmonic current waveforms constituting the calculated input current waveform in the rectifier circuit exceed the predetermined level.

2. A method according to claim 1, wherein the predetermined current drawn by the load from the rectifier circuit is the maximum current that the load may draw from the rectifier circuit.

3. A method according to claim 1, further comprising the step of formulating, for each interval, a current differential equation for the current flowing through the inductor with phase angle of the input voltage waveform.

4. A method according to claim 3, further comprising the step of solving the current differential equation to provide the input current waveform.

5. A method according to claim 4, wherein the step of solving the current differential equation comprises the step of using Laplace analysis.

6. A method according to claim 4, further comprising the step of utilising the solution of the current differential equation to define start and finish points for the first and second intervals.

7. A method according to claim 1, further comprising the steps of:

setting initial and final values for the voltage across the capacitor for each interval, and equating the final value for the voltage across the capacitor for each interval with the initial value for the voltage across the capacitor for the other interval.

8. A method according to claim 7, further comprising the step of formulating, for each interval, a voltage differential equation for the voltage across the capacitor with phase angle of the input voltage waveform.

9. A method according to claim 8, further comprising the step of solving the voltage differential equation.

10. A method according to claim 1, wherein the step of determining the amplitudes of harmonic current waveforms constituting the calculated input current waveform in the rectifier circuit comprises the step of applying Fourier analysis to the input current waveform.

11. A method according to claim 1, further comprising the step of determining a steady state operating point of the rectifier circuit.

12. A method according to claim 11, wherein the step of determining a steady state operating point of the rectifier circuit comprises the step of establishing an operation of the rectifier when the energy stored in the rectifier circuit at the end of each whole waveform of the input voltage is the same as that stored in the rectifier circuit at the end of each whole waveform of the input voltage.

13. A method according to claim 12, wherein the step of establishing an operation of the rectifier when the energy stored in the rectifier circuit at the end of each whole waveform of the input voltage is the same as that stored in the rectifier circuit at the end of each whole waveform of the input voltage comprises the step of considering the energy stored in the inductor and the capacitor.

14. A method according to claim 1, wherein the step of providing a value for the inductor at which none of the amplitudes of the harmonic current waveforms constituting the calculated input current waveform in the rectifier circuit exceed the predetermined level comprises the step of providing a value for the inductor at which the third harmonic of the harmonic current waveforms constituting the calculated input current waveform in the rectifier circuit does not exceed the predetermined level.

15. A method of determining a required relationship between the inductance of an inductor and the current flowing through the inductor, comprising the steps of:
  repeating the method of claim 1 for a plurality of input voltage waveforms or load currents, each of the plurality of input voltage waveforms or load currents causing different currents to flow through the inductor during the duty cycles thereof and
  determining the inductance required to maintain the amplitudes of harmonic current waveforms in the rectifier circuit below the predetermined level for each of the plurality of input voltage waveforms or load currents.

16. A rectifier circuit comprising an inductor and a capacitor, the rectifier circuit being produced by the steps of:
  defining the capacitance of the capacitor;
  defining a predetermined current to be drawn by a load from the rectifier circuit;
  calculating, using a resonant analysis method, an expression for the input current waveform in the rectifier circuit in terms of the inductance of the inductor, the capacitance of the capacitor, a predetermined input voltage waveform to be applied to the rectifier circuit and the predetermined current to be drawn from the rectifier circuit by the load, the resonant analysis method comprising the steps of: dividing a duty cycle of the power source into first and second intervals, in which current flows from the power source to the capacitor during the first interval and current does not flow from the power source to the capacitor in the second interval; setting initial and final values for the current flowing through the inductor for each interval; and equating the final value for the current flowing through the inductor for each interval with the initial value for the current flowing through the inductor for the other interval;
  determining the amplitudes of harmonic current waveforms constituting the calculated input current waveform in the rectifier circuit;
  providing a value for the inductor at which none of the amplitudes of the harmonic current waveforms constituting the calculated input current waveform in the rectifier circuit exceed a predetermined level; and
  constructing the rectifier circuit to contain an inductor having the provided value of inductance.

17. A rectifier circuit according to claim 16, wherein the inductor has an inductance that varies with the current flowing therethrough.

* * * * *